April 8, 1969  C. A. EGGERT  3,437,873
DISPLAY SYSTEM SECTOR SELECTION AND AMPLIFICATION MEANS
Filed Jan. 20, 1967  Sheet 1 of 3
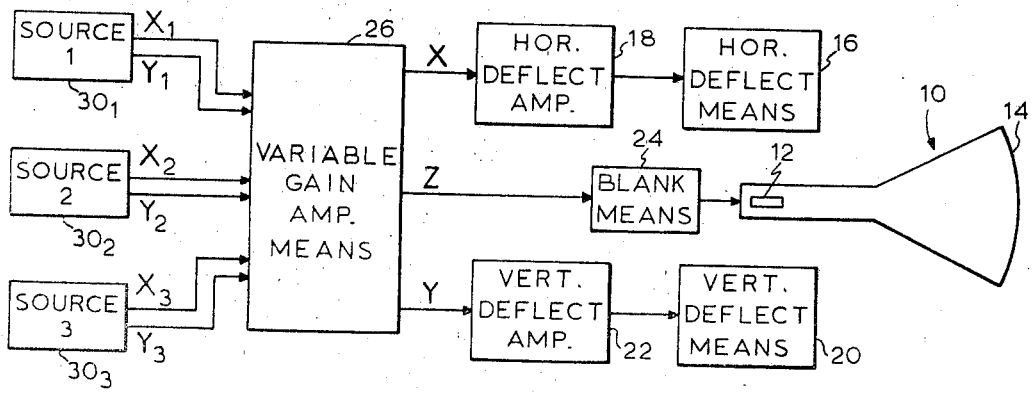
FIG. 1
FIG. 2(a)
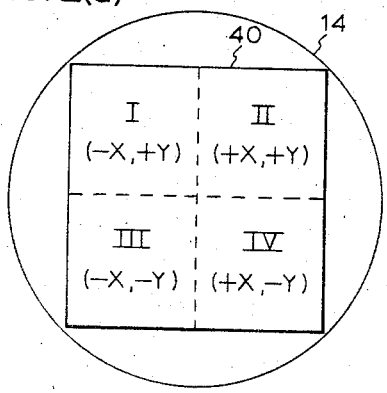
FIG. 2(b)
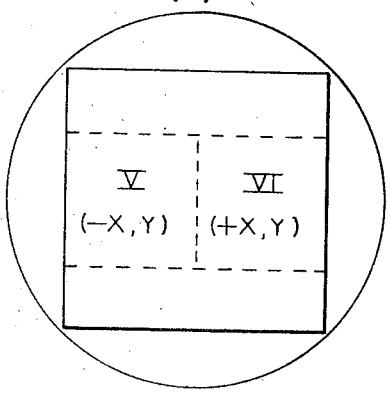
FIG. 2(c)
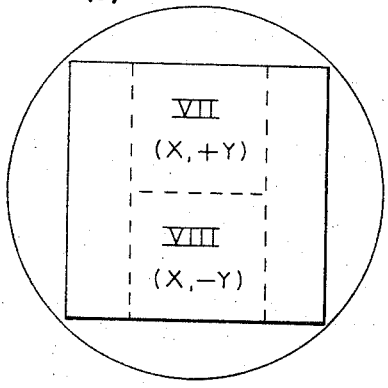
FIG. 2(d)
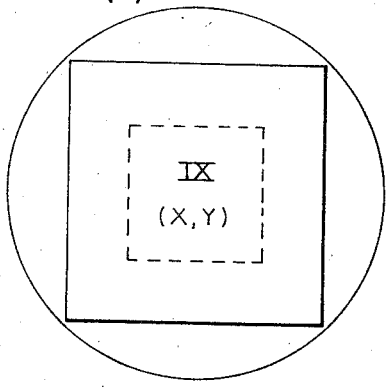
*INVENTOR.*
CARL A. EGGERT
BY Lindenberg & Freilich
ATTORNEYS

INVENTOR.
CARL A. EGGERT

United States Patent Office 3,437,873
Patented Apr. 8, 1969

3,437,873
DISPLAY SYSTEM SECTOR SELECTION AND AMPLIFICATION MEANS
Carl A. Eggert, Canoga Park, Calif., assignor to The Bunker-Ramo Corporation, Canoga Park, Calif., a corporation of Delaware
Filed Jan. 20, 1967, Ser. No. 610,613
Int. Cl. H01j 29/70
U.S. Cl. 315—22    11 Claims

ABSTRACT OF THE DISCLOSURE

Apparatus particularly useful in a cathode ray tube display system for enabling any one of nine fractional portions of the display to be enlarged and presented as a full scale display. The apparatus includes means for centering the selected fractional portion and for increasing the gain of the deflection signals to cause the fractional portion to occupy the full display area. In addition, the apparatus includes means for sharply limiting the amplitude of the deflection signals prior to their subsequent application to the deflection amplifiers. Means are also provided for sensing when limiting is required and for blanking the CRT beam in response thereto.

Background of the invention

This invention relates generally to systems for displaying information, as, for example, on a cathode ray tube (CRT).

CRT display systems are being used with increasing frequency for enabling human operators to communicate with digital computers. In such systems, the computer provides signals which move the CRT beam to generate meaningful displays comprised of text or graphical material, for example, the graphical material can constitute a map, a curve defining some mathematical function, material to be superimposed on a photographic image projected on the CRT face, or other information. Regardless of the particular material displayed, the operator will often find it useful to be able to select a particular portion or sector of the display and enlarge it in order to be able to see that portion in greater detail.

Summary of the invention

In accordance with the present invention, a display system is provided including amplification means enabling an operator to select any one of a plurality of fractional portions of the full display area and to enlarge that portion by centering it with respect to the total display area and increasing the gain of the deflection signals.

In accordance with one aspect of the invention, means are provided for sharply limiting the amplitude of the deflection signals provided by the amplification means prior to applying them to the deflection amplifiers driving the deflection means. In the preferred embodiment of the invention, limiting is accomplished by providing first and second special feedback paths from the output to the input of the amplification means, which paths are normally open but which are respectively closed when the amplification means output signal tends to rise above or fall below a certain level.

In accordance with a further aspect of the present invention, sensing means are provided for determining when limiting is occurring, and in response thereto the CRT beam is blanked in order to prevent the formation of a glow around the CRT display area.

Brief description of the drawings

FIGURE 1 is a block diagram of a display system incorporating the teachings of the present invention;

FIGS. 2(a)–(d) illustrate a plurality of different fractional portions of the total CRT display area which can be selected for enlargement;

Figure 3:
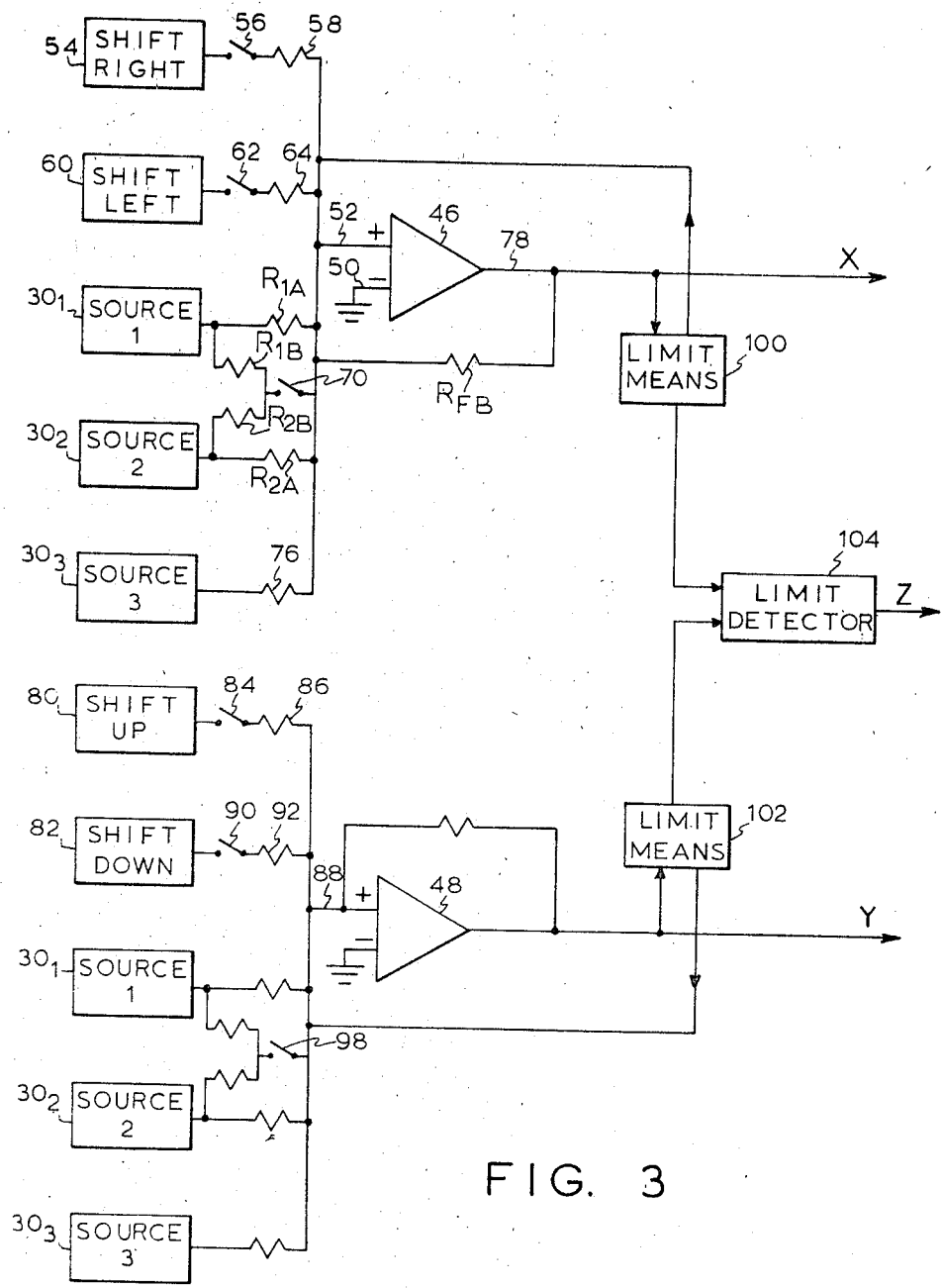
FIG. 3 is a block schematic diagram of the variable gain amplification apparatus in accordance with the present invention.

Attention is now called to FIG. 1, which illustrates a display system incorporating a display device 10, herein illustrated as a cathode ray tube (CRT) having deflectable means therein for writing on a target. In the display device illustrated, the deflectable means comprises an electron beam produced by a gun 12. The beam is, of course, able to write information onto the target or front face 14 of the CRT 10. The beam can be deflected horizontally by horizontal deflection means 16 in response to a deflection signal applied thereto by a horizontal deflection amplifier 18. Similarly, the beam can be deflected in a vertical direction by vertical deflection means 20 in response to a deflection signal applied thereto by a vertical deflection amplifier 22. The blanking and unblanking of the beam can be controlled by a blank means 24.

In accordance with the present invention, a variable gain amplification means 26 is provided to respectively provide a horizontal deflection signal X to the horizontal deflection amplifier 18, a vertical deflection signal Y to the vertical deflection amplifier 22, and a blank signal Z to the blank means 24.

The variable gain amplification means 26 provides the output signals X, Y and Z in response to input signals supplied thereto by various sources 30. Thus, source $30_1$ contributes horizontal and vertical signal components $X_1$ and $Y_1$ to the input of amplification means 26. Similarly, sources $30_2$ and $30_3$ contribute other horizontal and vertical deflection signal components to the amplification means 26.

The sources 30 can be of considerably different types depending upon the particular system and the use being made of the system. Thus, in one operating system, source $30_1$, comprises a circle generator which generates deflection signal components $X_1$ and $Y_1$ in phase quadrature which deflect the beam to draw a circle on the CRT face 14. The source $30_2$ can comprise a means for providing deflection signal components $X_2$ and $Y_2$ which can move the beam to any position on the CRT face 14 and thus, for example, can be used to describe a vector between any two defined end points. The source $30_3$, on the other hand, can comprise means providing deflection signal components causing the beam to generate a raster for writing text material, for example. Other deflection signal component sources can also contribute to the input to the amplification means 26, and it should be understood that the particular sources 30 that have been mentioned herein are to be considered exemplary only.

In response to the deflection signal components provided by the sources 30, the beam will be deflected to describe a desired pattern on the CRT face 14. In normal usage, the desired information pattern is displayed within a rectangular area 40 of the CRT face 14, as shown in FIGS. 2(a)–(d). The portions of the face around the area 40 are normally masked so as not to be visible to the operator.

In accordance with a preferred embodiment of the invention, the variable gain amplification means 26 of FIG. 1 is provided for the purpose of enabling an operator to selectivity cause the information pattern displayed in any one of nine fractional portions or sectors (I–IX) of the area 40 to be enlarged so as to occupy the full area 40. It is to be noted that each of the nine sectors comprises one-fourth of the total display area 40 of the face 14. The position of each of the nine sectors can be expressed in terms of its relationship to the vertical and horizontal tube axes. Thus, the position of sector I, which is located at the upper left-hand portion of the area 40, can be defined by the coordinates $-X$, $+Y$. Similarly, all other sectors which are located to the left of the vertical axis can be defined by the coordinate $-X$, while sectors positioned to the right of the vertical axis can be defined by the coordinate $+X$. Sectors such as sectors VII, VIII, and IX are defined by the coordinate X. Similarly, the vertical position of each sector is defined by the appropriate Y coordinate; i.e., $-Y$, Y, or $+Y$, where $-Y$ represents a position below the horizontal axis.

Briefly, in order to enable an operator to select any one of the nine sectors and enlarge the information therein so as to cause it to occupy the entire area 40, means are provided for initially centering the selected sector with respect to the vertical and horizontal axes and then doubling the gain of both the horizontal and vertical deflection signals. Thus, in order to cause the information normally displayed in sector I to occupy the entire area 40, bias deflection signals can be provided in the varibale gain amplification means 26 to vertically lower the position of sector I to thus effectively reduce its coordinate from $+Y$ to Y and to shift it right to thus increase its horizontal coordinate from $-X$ to X. By so biasing the deflection signals, the information represented in sector I is effectively shifted to the position illustrated for sector IX. By subsequently doubling the gain of both the horizontal and vertical deflection signals, the information represented in sector I will be enlarged to occupy the full area 40.

Attention is now called to FIG. 3, which illustrates a block diagram of a preferred embodiment of the variable gain amplification means 26 shown in FIG. 1. The amplification means of FIG. 3 includes a substantially conventional differential input amplifier 46 to handle the X deflection signal components and a substantially identical differential input amplifier 48 to handle the Y deflection signal components.

A first input terminal 50 of the amplifier 46 is connected to a source of reference potential such as ground. A second input terminal 52 is connected so as to constitute a summing junction to which each of a plurality of deflection signal component sources and bias deflection signal sources are coupled through appropriate impedances. More particularly, a first source of bias deflection signals 54 is connected to the input terminal 52 through a switch 56 connected in series with a resistor 58. When the switch 56 is closed, the source 54 provides a bias signal through resistor 58 to the amplifier 46 in order to move the information pattern displayed in area 40 of FIG. 2 to the right This action can thus center sectors I, III and V with respect to the vertical tube axis. A second source of bias signals 60 is connected through a switch 62 and a resistor 64 to the input terminal 52. In response to the switch 62 being closed, the source 60 provides a bias signal to the amplifier 46, which functions to shift the information pattern displayed in area 40 to the left. Thus, closure of the switch 62 can center sectors II, IV and VI with respect to the vertical tube axis.

The X deflection signal component output terminal of previously referred to source $30_1$ is connected through resistor $R_{1A}$ to input terminal 52. A resistor $R_{1B}$ is connected in series with switch 70, and both are connected in parallel with the resistor $R_{1A}$. Resistors $R_{1A}$ and $R_{1B}$ are equal in value to effect a doubling of gain. The X deflection signal component of previously referred to source $30_2$ is similarly connected through resistor $R_{2A}$ to the input terminal 52 of amplifier 46. Resistor $R_{2B}$ is connected in series with switch 70, and both are connecter in parallel with resistor $R_{2A}$. Likewise, resistors $R_{2A}$ and $R_{2B}$ are equal to achieve a time two magnification. The X deflection signal component output terminal of source $30_3$ is connected through resistor 76 to the input terminal 52 of amplifier 46.

The output terminal 78 of amplifier 46 is connected through a feedback resistor $R_{FB}$ to the input terminal 52. As is well known, the closed loop gain for the amplifier 46 is equal to the ratio of the feedback resistor $R_{FB}$ to the input resistance $R_{IN}$. Thus, with switch 70 open, the gain of amplifier 46 to the signal provided by source $30_1$, for example, would be equal to $R_{FB}/R_{1A}$. It should be apparent that by closing the switch 70 the resistance $R_{1B}$ is connected in parallel with the resistance $R_{1A}$ to thereby cut the effective input resistance $R_{IN}$ in half to thus double the gain. It should be apparent that the gain exhibited to the signals provided by the sources 54, 60, and $30_3$ will not be affected by the closure of switch 70. Although the various switches have, for simplicity, been illustrated as mechanical devices, it should be appreciated that in practice electronic switches would probably be employed.

Thus, from what has been said thus far with respect to FIG. 3, it should be apparent that by properly operating the switches 56, 62, and 70, any one of the nine sectors illustrated in FIGS. 2(a)–(d) can be horizontally centered in the area 40, and the horizontal gain of the deflection signals provided by sources $30_1$ and $30_2$ can be doubled to thus cause the information in the sector to be displayed across the full width of the area 40. In order to vertically center each of the sectors, bias deflection signal sources 80 and 82 are provided. The source 80 is connected through switch 84 and resistor 86 to the input terminal 88 of amplifier 48. The bias source 82 is connected through switch 90 and resistor 92 to the amplifier input terminal 88.

The Y deflection signal component output terminals of sources $30_1$, $30_2$, and $30_3$ are connected to the input terminal 88 of amplifier 48 in the identical manner as the X deflection signal component output terminals of the sources are connected to the input terminal 52 of amplifier 46. Consequently, it should be realized that, by closing switch 98, the vertical gain displayed to the vertical deflection signal components provided by sources $30_1$ and $30_2$ can be doubled.

From the foregoing, it should be appreciated that the apparatus of FIG. 3 enables an operator to select any one of the nine sectors illustrated in FIGS. 2(a)–(d) and to cause the information contained therein to be enlarged and displayed on the full area 40. It should also be noted that the signals provided by source $30_3$ are not doubled by the amplifying means to thus retain normal character spacing.

The output of amplifiers 46 and 48 of FIG. 3 are intended to be respectively connected to the horizontal deflection amplifier 18 and the vertical deflection amplifier 22 of FIG. 1. It should be appreciated that by doubling the gain of the amplifiers 46 and 48 the output signals provided thereby may exceed the input voltage ratings of the deflection amplifiers 18 and 22. As a consequence, it is desirable to provide means for limiting the amplitude of the output signals provided by the amplifiers 46 and 48. In order to do this, a limit means 100 is connected to the output terminal 78 of amplifier 46, which controls a feedback path to the input terminal 52. A similar limit means 102 is connected between the output and input terminals of amplifier 48. As will be explained in greater detail in connection with FIG. 4, the limit means 100 is responsive to the output signal, provided by amplifier 46, either rising above or falling below a certain predetermined level for effectively controlling the potential at the input terminal 52 to limit the output voltage variation. By providing the limit means 100 and 102, the input voltage ratings of the deflection amplifiers 18 and 22 will not be exceeded.

As a consequence of the gain of amplifiers 46 and 48 being doubled, the CRT beam will often be deflected to the areas of the CRT face 14 outside of the rectangular area 40, where they will be limited as discussed above, thereby superimposing a multiplicity of displayed information. Even though these outer areas may be masked to the operator by some opaque means, the beam impinging on these areas can create a glow which often may be disturbing to the operator. As a consequence, in order to prevent this glow, a limit detector 104 is provided, which senses when the limit means 100 or 102 is limiting, and in response thereto provides the previously referred to blanking signal Z, which controls the blank means 24. As a consequence, the beam is blanked whenever it impinges on the face 14 outside of the area 40.

Figure 4:
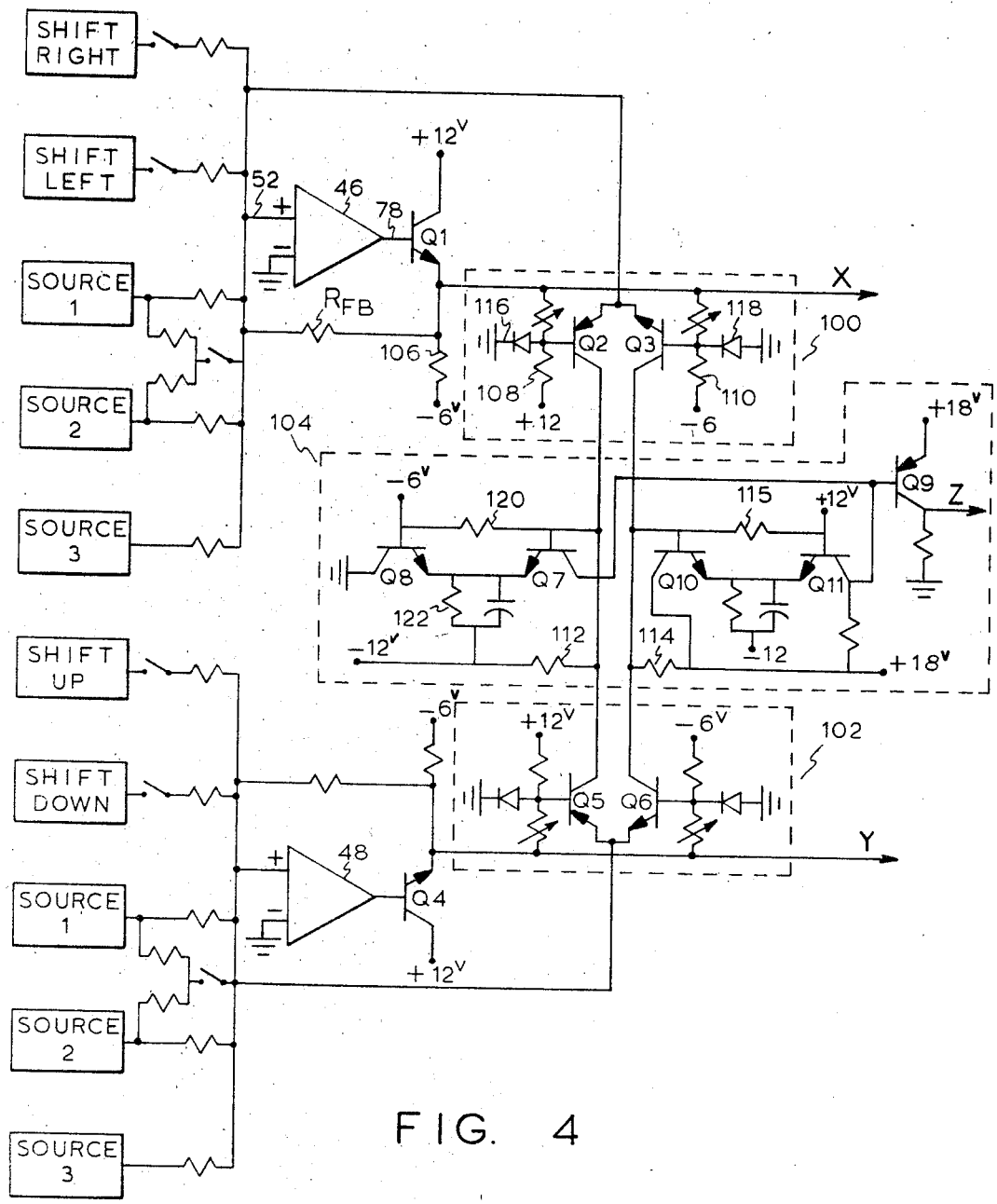
FIG. 4 is a block schematic diagram of the apparatus of FIG. 3 shown in greater detail.

Attention is now called to FIG. 4, which illustrates the limit means 100 and 102 and the limit detector 104 in greater detail. In order to provide increased current gain, the output terminal 78 of amplifier 46 is connected to the base of an NPN transistor Q1 whose collector is connected to a source of positive potential, e.g., +12 volts. The emitter of transistor Q1 is connected through a resistor 106 to a source of negative potential, e.g., −6 volts. The previously mentioned feedback resistor $R_{FB}$ is connected between the emitter of transistor Q1 and the input terminal 52 of amplifier 46, thereby introducing transistor Q1 into the feedback loop. The emitter of transistor Q1 is connected to the limit means 100, which includes a pair of variable voltage divider networks 108 and 110. More particularly, the emitter of transistor Q1 is connected to the upper terminal of networks 108 and 110, whose lower terminals are respectively connected to a source of positive potential, e.g., +12 volts, and a source of negative potential, e.g., −6 volts. The limit means 100 further includes a pair of complementary transistors Q2 and Q3 connected as emitter followers. Transistor Q2 is illustrated as comprising a PNP transistor whose emitter is connected to the input terminal 52 of amplifier 46 and whose collector is respectively connected through resistors 112 and 120 to sources of negative potential, e.g., −12 and −6 volts. The emitter of NPN transistor Q3 is also connected to the input terminal 52 of amplifier 46. The collector of transistor Q3 is respectively connected through resistors 114 and 115 to sources of positive potential, e.g., +18 and +12 volts. The bases of transistors Q2 and Q3 are respectively connected to taps in the variable voltage divider networks 108 and 110. In addition, a diode 116 connects the base of transistor Q2 to ground to thus limit the voltage swing across the base emitter junction. Diode 118 is similarly connected to the base of transistor Q3.

In the operation of the limit means 100, consider that, as a consequence of the gain of amplifier 46 being doubled, an excessively high positive potential appears on the emitter of transistor Q1. As a consequence, the potential on the base of transistor Q3 will increase to thereby cause current to be fed back through the resistor 115 and transistor Q3 to the input terminal 52. This feedback current will sharply limit the output of the amplifier 46 without loading the amplifier inasmuch as the source of positive potential connected to resistor 115 will be able to provide sufficient current to effectively drop the gain of the amplifier to zero. The current required by the amplifier is reduced by the beta of the transistor, i.e., Q2 or Q3, or, stated otherwise, the effective impedance in the feedback path is appropriately reduced by a factor of beta.

Similarly, if the emitter of transistor Q1 falls below a predetermined level, this will be reflected at the base of transistor Q2, which will therefore draw current away from the input terminal 52 through the resistor 120, thereby again sharply limiting the output of amplifier 46. It should be clear that the potentials at which the transistors Q2 and Q3 begin to conduct are determined by the setting of the variable voltage divider networks 108 and 110. If fixed, rather than variable, limiting is desired, the variable networks 108 can be replaced by fixed resistors.

It should be apparent that the limit means 102, comprised of transistors Q5 and Q6, and connected to the emitter of transistor Q4, is substantially identical to the limit means 100. It therefore will not be described in detail.

The limit detector 104 operates to sense current flow in the collector path of the transistors of either limit means 100 or 102. The limit detector 104 is essentially comprised of two portions, the first portion being responsive to current flow through the transistor Q2 or Q5, and the second portion being responsive to current flow through the transistor Q3 or Q6. More particularly, note that the base of NPN transistor Q7 is connected to the collectors of transistors Q2 and Q5 and through a resistor 120 to a source of negative potential, e.g., −6 volts. Transistor Q7 is connected in a differential amplifier arrangement with NPN transistor Q8, whose base is connected directly to the source of negative potential (−6 volts). The collector of transistor Q8 is connected to a reference potential such as ground. The emitters of transistors Q7 and Q8 are connected together and through a parallel RC circuit 122 to a source of negative potential, e.g., −12 volts. In the absence of current flow in the emitter-collector path of the transistor Q2 or Q5, the base of transistor Q8 will be more positive than the base of transistor Q7, which is held slightly more negative than −6 volts by the potential applied through resistor 112. (The resistor 112 is much larger in value than resistor 120.) However, when conduction through transistor Q2 or Q5 is initiated, the potential on the base of transistor Q7 will become more positive as a consequence of the drop across resistor 120, thereby turning transistor Q7 on and transistor Q8 off. This, of course, will lower the potential on the collector of transistor Q7 and therefore turn PNP transistor Q9 on. The collector of transistor Q9 provides the blank signal Z to blank means 24 of FIG. 1.

In a similar manner, current conduction through transistor Q3 or Q6 is detected to control transistor Q9. More particularly, when transistors Q3 or Q6 are not conducting, the base of transistor Q10 is at a more positive potential than the base of transistor Q11 so that transistor Q10 conducts, consequently holding transistor Q11 off. However, when transistor Q3 or Q6 turns on, thereby drawing current through resistor 115, the potential at the base of transistor Q10 drops, thereby enabling the transistor Q11 to turn on to consequently also turn transistor Q9 on.

Accordingly, it should now be apparent that the variable gain amplification means 26 of FIG. 1, shown in greater detail in FIGS. 3 and 4, functions to enable an operator to select any one of a plurality of fractional portions of the total display area (FIG. 2) and to enlarge the selected portion so as to fill the entire area 40. Enlargement is accomplished by doubling the gain of the deflection signals, which action, however, may cause the input voltages applied to the deflection amplifiers 18 and 22 of FIG. 1 to exceed the input voltage rating of the amplifiers. In order to prevent this, the limiting means 100 and 102 have been provided for sharply limiting the output signals provided by the amplifiers 46 and 48. In addition, in order to prevent the development of a glow on the tube face 14 around the perimeter of area 40 of FIG. 2, limit detection means 104 are provided for sensing limiting and for blanking the beam in response thereto.

The embodiments of the invention in which an exclusive property or privilege is claimed are defined as follows:

1. Apparatus useful in combination with a cathode ray tube having a target, means generating an electron beam and deflection means responsive to deflection signals for deflecting said beam to describe a display on said target, for selecting a fractional portion of said display and for selectively changing the size of said selected portion, said apparatus including:
   means for developing bias signals for substantially centering said selected portion with respect to said target;
   an amplifier having an input terminal and an output terminal;
   means for coupling said deflection signals to said amplifier input terminal;
   means for coupling said amplifier output terminal to said deflection means;
   means for selectively varying the gain of said amplifier;
   first and second limiter feedback paths each coupling said amplifier output terminal to said amplifier terminal for limiting the amplitude of voltage variations appearing at said output terminal;
   said first limiter feedback path including a first transistor having a collector, an emitter, and a base;
   said second limiter feedback path including a second transistor having a collector, an emitter, and a base;
   means coupling said amplifier output terminal to said first and second transistor bases;
   means coupling said first and second transistor emitters to said amplifier input terminal;
   first and second sources of reference potential; and
   means respectively coupling said first and second transistor collectors to said first and second sources of reference potential.

2. The apparatus of claim 1 wherein said means coupling said amplifier output terminal to said first and second transistor bases respectively comprises first and second variable impedance voltage dividers.

3. The apparatus of claim 1 including limit sensing means for sensing conduction in either said first or second transistor; and
   means responsive to said limit sensing means for blanking said electron beam.

4. A display apparatus including:
   a vertical deflection means;
   a horizontal deflection means;
   a vertical deflection amplifier having an input terminal and an output terminal;
   a horizontal deflection amplifier having an input terminal and an output terminal;
   a source of vertical deflection signals coupled to said vertical deflection amplifier input terminal;
   a source of horizontal deflection signals coupled to said horizontal deflection amplifier input terminal;
   means respectively coupling said vertical and horizontal deflection amplifier output terminals to said vertical and horiozntal deflection means;
   a first limiter feedback path coupled between said vertical deflection amplifier output terminal and said vertical deflection amplifier input terminal;
   a second limiter feedback path coupled between said horizontal deflection amplifier output terminal and said horizontal deflection amplifier input terminal;
   said first and second limiter feedback paths respectively including first and second transistors each having a collector, an emitter, and a base;
   means respectively coupling said vertical and horizontal deflection amplifier output terminals to said first and second transistor bases;
   a first source of reference potential;
   means connecting the emitter and collector of said first transistor between said first source of reference potential and said vertical deflection amplifier input terminal; and
   means connecting the emitter and collector of said second transistor between said first source of reference potential and said horizontal deflection amplifier input terminal.

5. The apparatus of claim 4 including limit sensing means for sensing current conduction in the emitter-collector paths of either said first or second transistors.

6. The apparatus of claim 4 including a third limiter feedback path coupled between said vertical deflection amplifier output terminal and said vertical deflection amplifier input terminal and a fourth limiter feedback path coupled between said horizontal deflection amplifier output terminal and said horizontal deflection amplifier input terminal;
   said third and fourth limiter feedback paths respectively including third and fourth transistors each having a collector, an emitter, and a base;
   means respectively coupling said vertical and horizontal deflection amplifier output terminals to said third and fourth transistor bases;
   a second source of reference potential;
   means connecting the emitter and collector of said third transistor between said second source of reference potential and said vertical deflection amplifier input terminal; and
   means connecting the emitter and collector of said fourth transistor between said second source of reference potential and said horizontal deflection amplifier input terminal.

7. The apparatus of claim 6 wherein said first and second limiter feedback paths are responsive to voltage excursions in a first direction at said vertical and horizontal deflection amplifier output terminals, respectively; and wherein
   said third and fourth limiter feedback paths are responsive to voltage excursions in a second direction at said vertical and horizontal deflection amplifier output terminals, respectively.

8. In combination with an amplifier having an input terminal and an output terminal, means for limiting voltage variations at said output terminal, comprising:
   first and second transistors each having a base, an emitter, and a collector;
   first and second means respectively including first and second variable impedances coupling said output terminal to said first and second transistor bases;
   first and second sources of reference potential; and
   means respectively connecting the emitter-collector paths of said first and second transistors between said input terminal and said first and second sources of reference potential.

9. The combination of claim 8 wherein said first and second transistors are of complementary types; and
   means connecting the emitter of each of said transistors to said input terminal.

10. In combination with an amplifier having an input terminal and an output terminal, means for limiting voltage variations at said output terminal, comprising:
    first and second transistors each having a base, an emitter, and a collector;
    first and second means coupling said output terminal to said first and second transistor bases;
    first and second sources of reference potential;
    means respectively connecting the emitter-collector paths of said first and second transistors between said input terminal and said first and second sources of reference potential; and
    means for sensing current in the emitter-collector path of either said first or second transistor.

11. The combination of claim 10 wherein said means for sensing current comprises third and fourth transistors each having a base, en emitter, and a collector;
- means connecting said third and fourth transistor emitters in common;
- impedance means interconnecting said third and fourth transistor bases;
- means applying a fixed potential to said third transistor base; and
- means coupling said fourth transistor base to said emitter-collector paths of said first and second transistors.

References Cited

UNITED STATES PATENTS

| 3,011,164 | 11/1961 | Gerhardt | 315—24 X |
| 3,294,981 | 12/1966 | Bose | 307—237 |

RICHARD A. FARLEY, Primary Examiner.

T. H. TUBBESING, Assistant Examiner.

U.S. Cl. X.R.

315—24, 26; 340—324; 307—237